(12) United States Patent
Musolesi et al.

(10) Patent No.: US 10,968,840 B2
(45) Date of Patent: Apr. 6, 2021

(54) METHOD TO MANUFACTURE A THROTTLE VALVE FOR AN INTERNAL COMBUSTION ENGINE PROVIDED WITH A CONDITIONING CIRCUIT

(71) Applicant: MARELLI EUROPE S.p.A., Corbetta (IT)

(72) Inventors: Stefano Musolesi, San Giovanni in Persiceto (IT); Marcello Colli, Reggio Emilia (IT)

(73) Assignee: MARELLI EUROPE S.p.A., Corbetta (IT)

( * ) Notice: Subject to any disclaimer, the term of this patent is extended or adjusted under 35 U.S.C. 154(b) by 27 days.

(21) Appl. No.: 16/458,448

(22) Filed: Jul. 1, 2019

(65) Prior Publication Data

US 2019/0323437 A1    Oct. 24, 2019

Related U.S. Application Data

(62) Division of application No. 14/751,467, filed on Jun. 26, 2015, now Pat. No. 10,385,786.

(30) Foreign Application Priority Data

Jun. 26, 2014   (IT) .............................. BO2014A0349

(51) Int. Cl.
*F02D 9/10*     (2006.01)
*F02M 31/10*    (2006.01)
*F02D 1/00*     (2006.01)

(52) U.S. Cl.
CPC ........... *F02D 9/1085* (2013.01); *F02D 9/107* (2013.01); *F02D 9/108* (2013.01); *F02D 9/1035* (2013.01);

(Continued)

(58) Field of Classification Search
CPC ...... F02D 9/1085; F02D 9/1075; F02D 9/107; F02D 9/108; F02D 9/1035; F02M 31/102;

(Continued)

(56) References Cited

U.S. PATENT DOCUMENTS

| 4,934,341 A | 6/1990 | Otsuka et al. |
| 5,052,349 A | 10/1991 | Buelna |

(Continued)

FOREIGN PATENT DOCUMENTS

| DE | 19625154 C1 | 11/1997 |
| DE | 102007053329 A1 | 12/2008 |
| EP | 1348850 A1 | 10/2003 |

OTHER PUBLICATIONS

Search Report issued in Italian Patent Application No. BO2014A000349 dated Mar. 20, 2015.

*Primary Examiner* — Lawrence Averick
(74) *Attorney, Agent, or Firm* — Howard & Howard Attorneys PLLC

(57) ABSTRACT

A method to manufacture a throttle valve for an internal combustion engine comprising a valve body having a seat and a tube for the passage of conditioning fluid; an actuating device, which controls the rotation of a throttle plate; and a substantially uniform layer of a structural and heat-conducting resin interposed between the seat and the tube and applied on the entire available surface of the seat; the method comprising the steps of manufacturing the valve body provided with the seat by causing a first metal material to undergo a die casting process; applying a trace of the structural and thermosetting resin on the bottom of the seat; and inserting the tube into the seat so as to obtain a substantially uniform layer of the structural and thermosetting resin, which is interposed between the seat and the tube.

2 Claims, 3 Drawing Sheets

(52) U.S. Cl.
CPC ......... *F02D 9/1075* (2013.01); *F02M 31/102* (2013.01); *F02D 2001/006* (2013.01); *F02F 2200/00* (2013.01); *Y02T 10/12* (2013.01)

(58) Field of Classification Search
CPC ............. Y02T 10/12; B29L 2031/7492; B29L 2031/7506; B24B 39/00–39/065
See application file for complete search history.

(56) References Cited

U.S. PATENT DOCUMENTS

| | | | |
|---|---|---|---|
| 5,396,920 A | 3/1995 | Rausch et al. | |
| 6,089,536 A | 7/2000 | Watanabe et al. | |
| 6,193,211 B1 | 2/2001 | Watanabe et al. | |
| 6,408,817 B2 | 6/2002 | Torii et al. | |
| 6,516,776 B1 | 2/2003 | Kai et al. | |
| 7,661,405 B2 | 2/2010 | Matsuura et al. | |
| 7,669,581 B2 | 3/2010 | Sasaki | |
| 7,721,706 B2 * | 5/2010 | Kim | F02D 9/1035 123/337 |
| 8,247,050 B2 | 8/2012 | McCrea et al. | |
| 8,316,830 B2 * | 11/2012 | Keefover | F02D 9/04 123/568.21 |
| 9,062,636 B2 | 6/2015 | Nishimori et al. | |
| 9,638,141 B2 | 5/2017 | Barabasch et al. | |
| 9,938,893 B2 * | 4/2018 | Musolesi | F02M 26/11 |
| 2002/0174858 A1 | 11/2002 | Kato et al. | |
| 2004/0099245 A1 | 5/2004 | Kato et al. | |
| 2007/0240676 A1 | 10/2007 | Sasaki | |
| 2007/0240677 A1 | 10/2007 | Sasaki | |
| 2008/0313898 A1 * | 12/2008 | Kim | F02M 31/102 29/888.453 |
| 2009/0205611 A1 | 8/2009 | Tsugami et al. | |
| 2009/0308349 A1 | 12/2009 | Apel | |
| 2013/0025577 A1 | 1/2013 | Huesges et al. | |
| 2013/0140011 A1 * | 6/2013 | Watanabe | H05K 7/20509 165/168 |
| 2013/0160736 A1 | 6/2013 | Matsuzaki et al. | |
| 2015/0308324 A1 * | 10/2015 | Hannewald | F02M 26/73 165/48.1 |
| 2016/0025047 A1 | 1/2016 | Barabasch et al. | |
| 2016/0186652 A1 * | 6/2016 | Musolesi | F02B 37/22 123/561 |

* cited by examiner

METHOD TO MANUFACTURE A THROTTLE VALVE FOR AN INTERNAL COMBUSTION ENGINE PROVIDED WITH A CONDITIONING CIRCUIT

CROSS-REFERENCE TO RELATED APPLICATION

The present application is a divisional of U.S. patent application Ser. No. 14/751,467, filed on Jun. 26, 2015, and claims priority to and all the benefits of Italian Patent Application No. BO2014A000349, filed on Jun. 26, 2014, both of which are hereby expressly incorporated herein by reference in their entirety.

BACKGROUND OF THE INVENTION

1. Field of the Invention

The present invention relates to a method to manufacture a throttle valve for an internal combustion engine provided with a conditioning circuit.

2. Description of the Related Art

A throttle valve, which is arranged upstream of an intake manifold and adjusts the flow rate of the air which is fed to the cylinders, is normally provided in internal combustion engines. Conventional throttle valves typically have a valve body provided with a tubular feeding duct through which the intake or compressed air for the internal combustion engine flows. A throttle plate is housed in the feeding duct and is splined to a rotating shaft to rotate between an opening position and a closing position of the feeding duct. The rotation of the throttle valve plate is controlled by an actuator device which typically includes an electric motor coupled to the throttle valve plate shaft via a gear drive and at least one spring which pushes the throttle valve plate shaft towards the closing position (or rather towards a limp-home position close to the closing position).

The electric motor has a cylindrical body which is arranged in a tubular housing of the valve body arranged by the side of the feeding duct. The gear drive is arranged in a chamber of the valve body, which is defined by two shells: a first shell defining a removable lid and a second shell arranged next to the feeding duct and next to the tubular housing.

The valve body further includes a conditioning circuit which is defined by a channel, which may assume various conformations and routes. Where the channel is substantially L-shaped, it has a major branch provided in the upper portion of the second shell and a minor branch provided in the upper portion of the tubular housing. The channel is in hydraulic communication with a pump, which circulates conditioning fluid and feeds the channel itself for conditioning the various parts of the throttle valve.

Published European Patent No. EP1348850 describes, for example, a throttle valve provided with a heating circuit adapted to prevent the freezing of the valve itself provided with an elastically deformable tube made of a fuel and oil resistant rubberized fabric arranged in a variable section channel of an appendix of the valve body having a smaller diameter than the diameter of the elastically deformable tube which is arranged inside it. Published German Patent No. DE19625154 instead describes a device for heating a throttle valve made with an appropriately shaped tube which is connected to the valve body via mechanical fixing, such as a pair of brackets for example. Further, a layer of heat-conducting paste is interposed between the tube of the heating device and the valve body. The heat-conducting paste does not have a structural function and therefore mechanical fixing is needed to connect the tube to the valve body.

The entire valve body of most conventional throttle valves is made of metallic material, such as aluminum, and is monolithic (i.e. is formed seamlessly in one piece).

The valve body (i.e. the second shell, the feeding duct, and the tube housing) is made by casting (normally die-casting) and, if needed, is then mechanically machined. Pinholes and/or micro air bubbles may form in the valve body because the material is injected at relatively high temperatures (in the order of 700° C.), at equally high pressures (in the order of 1000 bar), and very rapidly for manufacturing the valve body by casting (normally die-casting). The pinholes and/or micro bubbles are difficult to see with unaided eye (but are visible only under X rays) and are difficult to identify during the step of setting and tuning the throttle valve.

Such pinholes and/or micro bubbles are particularly dangerous because with the aging of the valve body and, in the case of relatively high pressures involved, the passage of conditioning fluid in the conditioning circuit channel may put different micro bubbles into mutual communication and thereby cause the formation of channels for the passage of conditioning fluid towards the other components, in particular towards the electric motor, towards the feeding duct, or towards the outside environment.

SUMMARY OF THE INVENTION

It is the object of the present invention to provide a method for making a throttle valve for an internal combustion engine which is free from the drawbacks of the prior art and which is easy and cost-effective to implement at the same time. To this end, the present invention is directed toward a method for manufacturing a throttle valve for an internal combustion engine comprising a valve body entirely made of a first metallic material; an actuating device, which controls the rotation of a throttle plate around a rotation axis; an actuating device conditioning circuit defined in the valve body comprising a tube for the passage of a conditioning fluid, which is housed in a seat defined in the valve body and is made of a second metallic material able to conduct heat; and a substantially uniform layer of a structural and heat-conducting resin interposed between the seat and the tube and applied on the entire available surface of the seat;, wherein the method includes the steps of: manufacturing the valve body provided with the seat by causing the first metal material to undergo a die casting process; manufacturing the tube in the second metallic material chosen among steel, preferably stainless steel, or aluminum or copper; applying a trace of the structural and thermosetting resin on the bottom of the seat; and inserting the tube into the seat such that the resin present on the bottom of the seat moves upwards so as to completely skim an inner surface of the seat and partially the outer surface of the tube so as not to protrude from the seat towards an upper surface of the valve body and so as to obtain a substantially uniform layer of the structural and thermosetting resin, interposed between the seat and the tube.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
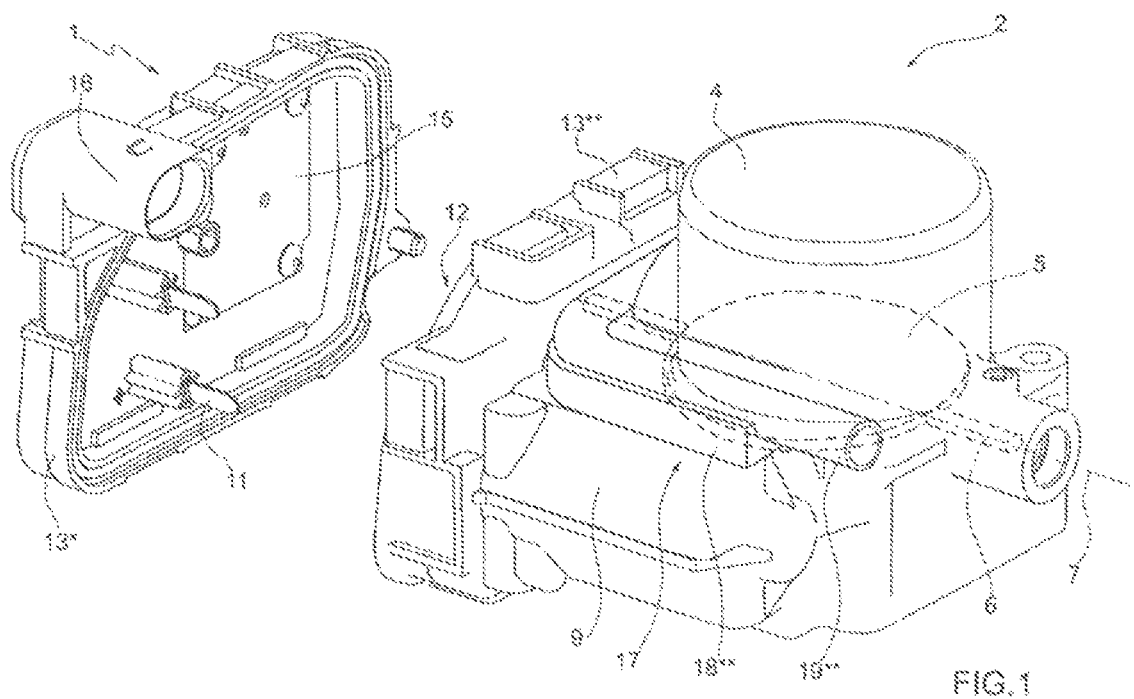
FIG. 1 is a perspective, partially exploded view with parts removed for clarity of a throttle valve made according to the present invention.
Figure 2:
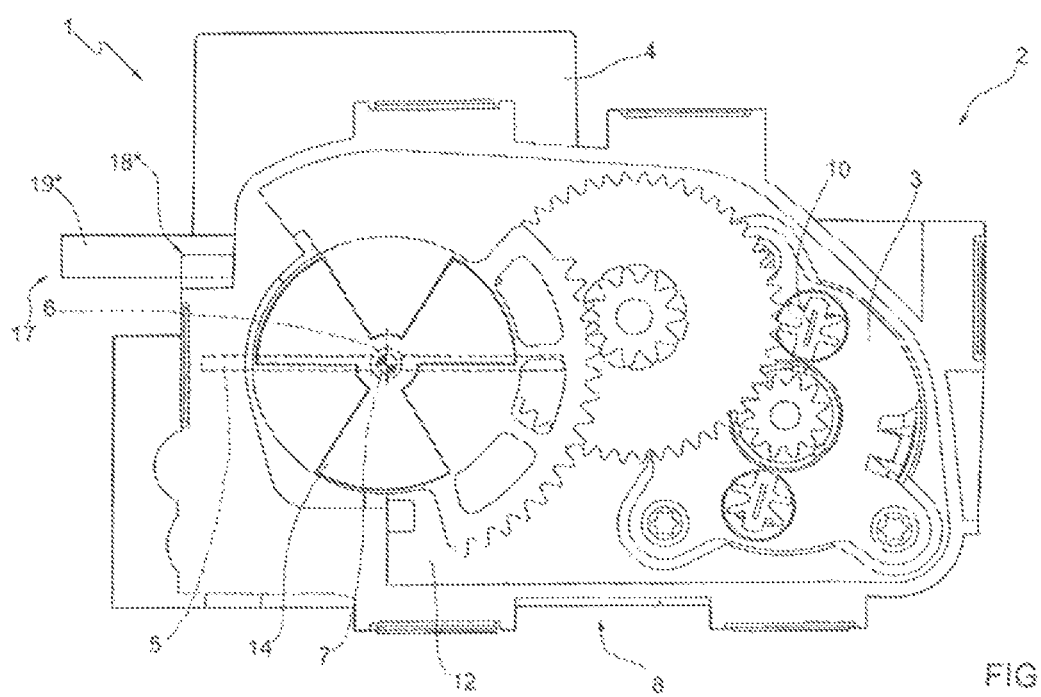
FIG. 2 is a front view with parts removed for clarity of the throttle valve in FIG. 1.

With reference now to the drawing(s), in FIGS. 1 and 2, numeral 1 indicates as a whole an electronically controlled throttle valve for an internal combustion engine (not shown, but generally known in the art). The throttle valve 1 includes a valve body 2 housing an electric motor 3 (see FIG. 2), a tubular circular section feeding duct 4 through which the air aspirated by the internal combustion engine flows, and a throttle valve plate 5 (diagrammatically shown with a dashed line), which is circular, engages the feeding duct 4, and rotates between an opening position and a closing position of the feeding duct 4 under the bias of the actuator device. The throttle valve plate 5 is splined onto a shaft 6 having a longitudinal rotation axis 7 to rotate between the opening position and the closing position under the bias of the actuator device.

As shown in FIG. 2, the actuator device includes the electric motor 3 which is coupled to the shaft 6 itself via a gear drive 8, a return spring coupled to the shaft 6 (not shown) and adapted to rotate the throttle valve 5 towards the closing position, and a contrast spring coupled to the shaft 6 (not shown) and adapted to rotate the throttle valve plate 5 towards a partial opening position or limp-home position defined by a stopper body (not shown) against the bias of the return spring.

The electric motor 3 has a cylindrical body, which is arranged in a tubular housing 9 (shown in FIG. 1) of the valve body 2 arranged by the side of the feeding duct 4 and is maintained in a determined position in the tubular housing 9 by a metallic plate provided with a pair of female electric connectors 10 (see FIG. 2), which are electrically connected to the electric motor 3 and are adapted to be engaged with a pair of respective male electric connectors 11 (see FIG. 1).

The gear drive 8 is arranged in a chamber 12 (see FIG. 2) of the valve body 2, which is defined by a first shell 13* and a second shell 13**. The first shell 13* defines a removable lid 13* (see FIG. 1) and a second shell 13** is arranged by the side of the feeding duct 4 and next to the tubular housing 9.

As shown in FIGS. 1 and 2, the throttle valve 1 includes an inductive contactless type position sensor, which is coupled to the shaft 6 and is adapted to detect the angular position of the shaft 6 (and, thus, of the throttle valve plate 5) to allow a feedback control of the position of the throttle valve plate 5 itself. The position sensor includes a rotor 14 (see in FIG. 2) integral with the shaft 6, and a stator 15 (see FIG. 1) supported by the removable lid 13* and arranged facing the rotor 14 in use.

As shown in FIG. 1, the removable lid 13* is provided with a female electric connector 16, which includes a series of electric contacts (not shown in detail): two electric contacts are connected to the male electric connectors 11 adapted to supply the electric motor 3, while other electric contacts are connected to the stator 15 of the position sensor.

The valve body 2 is entirely made of a first material, internally defines the feeding duct 4, and includes the tubular housing 9, which is arranged by the side of the feeding duct 4 and houses the electric motor 3 and the chamber 12, which houses the gear transmission 8 and is closed by the removable lid 13*. In other words, the shell 13, the feeding duct 4, and the tubular housing 9 are made of the first material In one embodiment, the valve body 2 (i.e. the shell 13, the feeding duct 4, and the tubular housing 9) is made of a metallic material, such as aluminum. Advantageously, the throttle valve 5 is made of the first metallic material of which the valve body 2 is made. Alternatively, the throttle valve plate 5 is made of a metallic material which is different from the metallic material of which the valve body 2 is made, but which behaves similarly to the first metallic material of which the valve body 2 is made. In this manner, the two parts which cooperate to define the closing of the feeding duct 4 are made of the same material (or in cases of mutually similar metallic materials) and thus have substantially the same type of behavior to heat variations and to aging.

Figure 3:
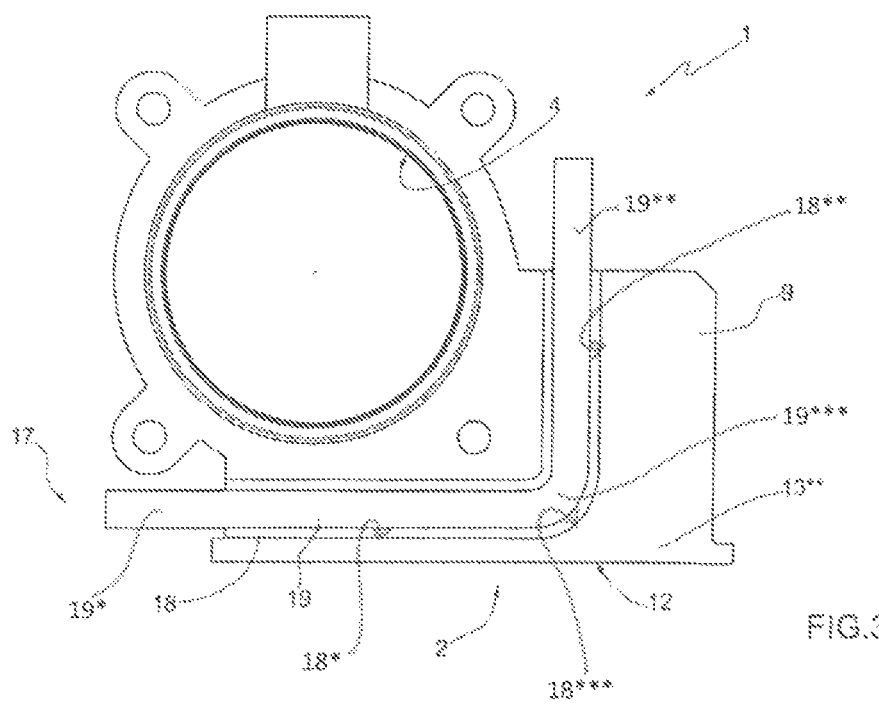
FIG. 3 is a plan view with parts removed for clarity of the throttle valve in FIG. 1.

As shown in FIG. 3, the valve body 2 includes a conditioning circuit 17 which, in turn, includes a seat 18 and a tube 19. In plan view, the seat 18 is substantially L-shaped and has a major branch 18* provided in the upper portion of the shell 13, a minor branch 18 provided in the upper portion of the tubular housing 9, and a curved connecting stretch 18*** between the major branch 18* and the minor branch 18**. The seat 18 accommodates the tube 19 inside, which is made of a second material and is also substantially L-shaped having a major branch 19*, a minor branch 19, and a curve connecting stretch 19* between the major branch and the minor branch. In one embodiment, the second material of which the tube 19 is made is chosen from a group including: steel (advantageously, stainless steel), copper, aluminum, or any other material with good heat exchange capacity. As shown in detail in FIGS. 5 and 6, in section, the seat 18 is circular segment shaped, is open on the top, and the shape of the inner surface 20 which defines the seat 18 itself is substantially complementary to the outer surface 21 of the tube 19. The tube 19 is in hydraulic communication with a pump (not shown) which circulates conditioning fluid and feeds fluid to the tube 19 to condition the various parts of the throttle valve 1.

The valve body 2 (i.e. the shell 13, the feeding duct 4, and the tube housing 9) is made by casting (normally die-casting) and, if needed, is then mechanically machined. In other words, the first material of which the valve body 2 (i.e. the shell 13, the feeding duct 4, and the tubular housing 9) is made by injection co-molding so as to define the seat 18 provided for housing the tube 19.

As shown in detail in FIGS. 3-6, the tube 19 is inserted in the seat 18 provided in the valve body 2 once the casting process of the valve body 2 itself is completed.

Figure 4:
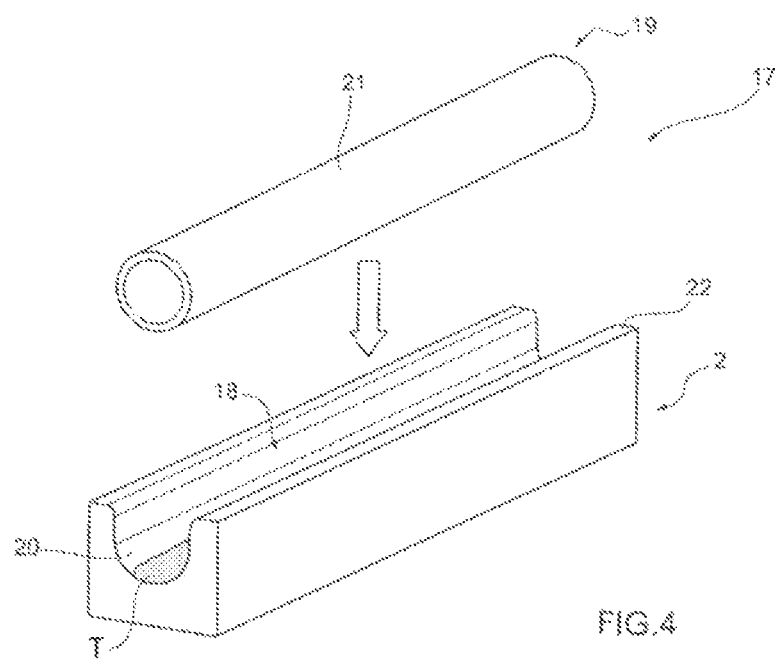
FIG. 4 is a perspective view of a conditioning circuit of the throttle valve in FIG. 1.
Figure 5:
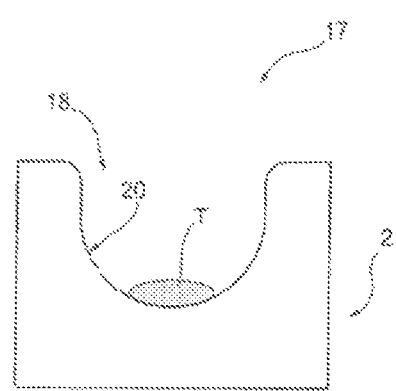
FIGS. 5 and 6 illustrate the detail of the conditioning circuit in FIG. 4 in various different, subsequent steps of the manufacturing method of the throttle valve in FIG. 1 from the front.
Figure 6:
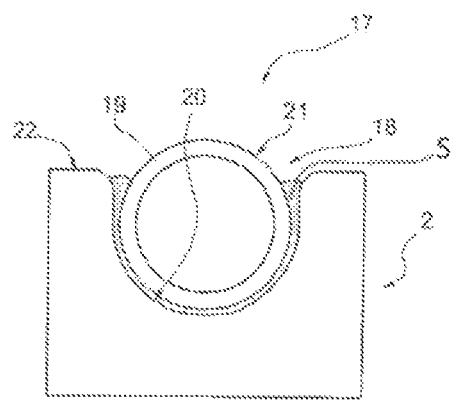

A trace T of structural and heat-conducting resin is applied once the casting process of the valve body 2 is completed. The trace T of the structural and heat-conducting resin is deposited with a specific application tool, advantageously on the bottom of the seat 18 itself (as shown in FIGS. 4 and 5). In one embodiment, a structural and heat-conducting resin is used, the basic fluidity of which is variable from liquid to semi-solid. In one embodiment, a structural heat-conducting and thermosetting resin is used. In other alternative embodiments, the structural heat-conducting resin is epoxy, or polyurethane or acrylic based.

It will be appreciated that the resin used for the trace T has structural value to allow the anchoring of the tube 19 in the seat 18 and, at the same time, allows the transmission of heat between the conditioning fluid which circulates the tube 19 and the various parts of the throttle valve 1.

After having deposited the trace T of the structural and heat-conducting resin, the tube 19 is inserted in the seat 18. The resin present on the bottom of the seat 18 moves upwards so as to completely skim the inner surface 20 of the seat 18 and partially the outer surface 21 of the tube 19 so as not to protrude from the seat 18 towards an upper surface 22 of the valve body 2. A substantially uniform layer S of structural and heat-conducting resin is thus formed between the seat 18 and the tube 19 (see FIG. 6).

In one embodiment, the valve body 2 is substantially subjected to a thermal treatment (e.g. via infrared, induction, or via passage in polymerization ovens) to allow to complete the polymerization of the structural and heat-conducting resin. Alternatively, the structural and heat-conducting resin may be of the thermosetting type. A monocomponent structural and heat-conducting resin or a bicomponent structural and heat-conducting resin may be advantageously applied; the polymerization temperature of the structural and heat-conducting resin is variable as a function of the components of the structural and heat-conducting resin itself.

Once polymerized, the resin can constrain the tube 19 to the seat 18 and further allows the heat exchange between the conditioning fluid and the air aspirated by the internal combustion engine which flows through the tubular feeding duct 4 defined in the valve body 2. Furthermore, the structural and heat-conducting resin has a high resistance to thermal shocks and relatively high working temperatures (in the order of 380° C.) equal to double the temperatures which can be found in the valve body 2.

In one embodiment, the seat 18 is open on the top and the tube 19 is rigidly constrained to the seat 18 exclusively via the structural and heat-conductive resin. In other words, there are no mechanical locks constraining the tube 19 in the specific seat 18.

In one variant, a mechanical lock (not shown) of the tube 19 in the specific seat 18 are provided, as for example a number of fixing brackets or plates distributed along the entire length of the tube 19.

It will be appreciated that the conditioning circuit 17 may have alternatively different conformations from the substantially L-shape conformation described above. In particular, according to alternative variants, the conditioning circuit 17 (i.e. the seat 18 and tube 19) has a rectilinear shape and is provided in the upper portion of the shell 13 or in the upper portion of the tubular housing 9**.

The throttle valve 1 described above has many advantages. In particular, the valve body 2 of the throttle valve 1 described above is simple and cost-effective to make because it can be easily made by injection molding the valve body 2 (i.e. the shell 13, the feeding duct 4, and the tubular housing 9) and subsequently applying the resin for locking the tube 19 in the seat 18. Furthermore, the valve body 2 of the throttle valve 1 described above has extremely low weight and manufacturing costs. Moreover, the throttle valve 1 allows to prevent the passage of conditioning fluid used in the conditioning circuit and contained in the tube 19 towards, for example, the electric motor 3, the feeding duct 4**, or towards the outside environment during use, independently from aging in use.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method to manufacture a throttle valve (1) for an internal combustion engine comprising a valve body (2) entirely made of a first metallic material; an actuating device, which controls the rotation of a throttle plate (5) around a rotation axis (7); an actuating device conditioning circuit (17) defined in the valve body (2) comprising a tube (19) for the passage of a conditioning fluid, which is housed in a seat (18) defined in the valve body (2) and is made of a second metallic material able to conduct heat; and a substantially uniform layer (S) of a structural and heat-conducting resin interposed between the seat (18) and the tube (19) and applied on the entire available surface of the seat (18); the method comprising the steps of:

manufacturing the valve body (2) provided with the seat (18) by causing the first metal material to undergo a die casting process;

manufacturing the tube (19) in the second metallic material chosen among steel, preferably stainless steel, or aluminum or copper;

applying a trace (T) of the structural and thermosetting resin on the bottom of the seat (18); and inserting the tube (19) into the seat (18) such that the resin present on the bottom of the seat (18) moves upwards so as to completely skim an inner surface (20) of the seat (18) and partially the outer surface (21) of the tube (19) so as not to protrude from the seat (18) towards an upper surface (22) of the valve body (2) and so as to obtain a substantially uniform layer (S) of the structural and thermosetting resin, interposed between the seat (18) and the tube (19).

2. A method according to claim 1, wherein the valve body (2) is subject to a thermal treatment to cause the polymerization of the structural and thermosetting resin.

\* \* \* \* \*